US005467288A

United States Patent [19]
Fasciano et al.

[11] Patent Number: 5,467,288
[45] Date of Patent: Nov. 14, 1995

[54] DIGITAL AUDIO WORKSTATIONS PROVIDING DIGITAL STORAGE AND DISPLAY OF VIDEO INFORMATION

[75] Inventors: Peter J. Fasciano, Natick, Mass.; Curt A. Rawley, Windham, N.H.; Thomas R. Hegg, New York, N.Y.; Mackenzie Leathurby, Newton; Jeffrey L. Bedell, Arlington, both of Mass.; James A. Ravan, Jr., Nashua, N.H.

[73] Assignee: Avid Technology, Inc., Tewksbury, Mass.

[21] Appl. No.: 45,658

[22] Filed: Apr. 9, 1993

Related U.S. Application Data

[63] Continuation-in-part of Ser. No. 867,052, Apr. 10, 1992, abandoned.

[51] Int. Cl.[6] .................................................. G06F 17/00
[52] U.S. Cl. .................................................. 364/514 R
[58] Field of Search ........................ 364/514; 395/152, 395/154; 360/8, 14.1, 14.3

[56] References Cited

U.S. PATENT DOCUMENTS

| | | | |
|---|---|---|---|
| 3,787,617 | 1/1974 | Fiori | 360/14.3 |
| 4,067,049 | 1/1978 | Kocy et al. | 360/14.3 |
| 4,214,278 | 7/1980 | Hunt et al. | 360/14 |
| 4,249,218 | 2/1981 | Davis et al. | 360/13 |
| 4,251,688 | 2/1981 | Furner | 179/1 |
| 4,375,083 | 2/1983 | Maxemchak | 364/900 |
| 4,641,253 | 2/1987 | Mastran | 395/154 |
| 4,746,994 | 5/1988 | Ettlinger | 360/13 |
| 4,757,540 | 7/1988 | Davis | 381/84 |
| 4,868,687 | 9/1989 | Penn et al. | 360/13 |
| 4,937,685 | 6/1990 | Barker et al. | 360/14.1 |
| 4,945,566 | 7/1990 | Mergel et al. | 381/41 |
| 4,956,806 | 9/1990 | Crowe et al. | 364/900 |
| 4,974,178 | 11/1990 | Izeki et al. | 364/523 |
| 5,033,804 | 7/1991 | Faris | 312/7.2 |
| 5,045,940 | 9/1991 | Peters et al. | 364/514 |
| 5,065,345 | 11/1991 | Knowles et al. | 395/154 |
| 5,111,409 | 5/1992 | Gasper et al. | 395/154 |
| 5,121,470 | 6/1992 | Trautman | 395/140 |
| 5,151,998 | 9/1992 | Capps | 395/800 |
| 5,202,961 | 4/1993 | Mills et al. | 395/159 |
| 5,204,969 | 4/1993 | Capps et al. | 395/800 |
| 5,220,611 | 6/1993 | Nakamura et al. | 381/48 |
| 5,227,892 | 7/1993 | Lince | 358/335 |
| 5,249,289 | 9/1993 | Thamm et al. | 395/600 |
| 5,274,758 | 12/1993 | Boitel et al. | 395/154 |
| 5,343,451 | 8/1993 | Iizuka | 395/600 |

FOREIGN PATENT DOCUMENTS

| | | |
|---|---|---|
| 0322100 | 6/1989 | European Pat. Off. . |
| 0390048 | 10/1990 | European Pat. Off. . |
| 0526064 | 2/1993 | European Pat. Off. . |
| 2235815 | 3/1991 | United Kingdom . |
| 2245745 | 1/1992 | United Kingdom . |
| WO88/02958 | 4/1988 | WIPO . |
| WO91/03053 | 3/1991 | WIPO . |

OTHER PUBLICATIONS

S. Ades et al., "Voice Annotation and Editing in a Workstation Environment", Proceedings Avios '86, Voice I/O Systems Applications Conference, Sep. 16–18, 1986, pp. 13–28.

(List continued on next page.)

Primary Examiner—Ellis B. Ramirez
Attorney, Agent, or Firm—Wolf, Greenfield & Sacks

[57] ABSTRACT

The invention disclosed herein is a digital audio workstation for the audio portions of video programs. It combines audio editing capability with the ability to immediately display video images associated with the audio program. The invention detects an operator's indication of a point or segment of audio information and uses it to retrieve and display the video images that correspond to the indicated audio programming. Another aspect of the invention is a labeling and notation system for recorded digitized audio or video information. The system provides a means of storing in association with a particular point of the audio or video information a digitized voice or textual message for later reference regarding that information.

34 Claims, 10 Drawing Sheets

OTHER PUBLICATIONS

D. C. Swinehart et al., "An Experimental Environment for Voice System Development", no date.

P. V. Rangan et al., "A Window–Based Editor for Digital Video and Audio", no date.

Rangan et al.; "Window–Based Editor for Digital Video and Audio"; IEEE Jan. 7–10, 1992.

Kirby et al.; "The Exploitation and Realization of a Random Access Digital Audio Editor," IEEE 1988.

Little et al.; "Multimedia Object Models for Synchronization and Databases." IEE Feb. 5–9, 1990.

Sakata; "Development and Evaluation of an In–House Multimedia Desktop Conference System." IEEE Apr. 1990.

"Volume History Display For A Personal Computer Audio Editor", IBM Technical Disclosure Bulletin, vol. 30, No. 10, Mar. 1988, New York, pp. 355–356.

"Three–Level Audio Object Display For A Personal Computer Audio Editor", IBM Technical Disclosure Bulletin, vol. 30, No. 10, Mar. 1988, New York, pp. 351–353.

Krieg, P., "Multimedia–Computer und die Zukunft des Film/Videoschnitts," Fernseh Und Kino–Technik, 45 Jahrqana—Nr. 5, pp. 252–254 (1991).

Mark Schubin, "The Rise of Random Access," Videography (Aug. 1989) pp. 25–32.

Gould, "Speech Filing–An Office System For Principles", IBM System Journal, vol. 23, No. 1, 1984.

Ruiz, "Voice and Telephony Applications For The Office Workstation", IEEE 1985.

Terry, "Managing Stored voice in the Etherphone System", ACM 1986.

Mackay et al., "Virtual Video Editing In Interactive Multimedia Applications", ACM 1989.

| LOCATORS | | |
|---|---|---|
| LOCATOR NO. | TIMECODE | COMMENT |
| L09 | 02:23:10:23 | SPEECH 1 |
| L10 | 02:21:12:01 | DOOR CLOSES |
| L11 | | |
| L12 | | |
| L13 | | |
| L14 | | |
| L15 | 02:24:21:10 | DOOR OPENS |

DIGITAL AUDIO WORKSTATIONS PROVIDING DIGITAL STORAGE AND DISPLAY OF VIDEO INFORMATION

CROSS REFERENCE TO RELATED APPLICATION

This application is a continuation-in-part of application Ser. No. 07/867,052 filed Apr. 10, 1992, now abandoned.

FIELD OF THE INVENTION

The invention relates to the field of digital audio editing. More specifically, it is a system for editing the digital audio portion of video programs.

BACKGROUND OF THE INVENTION

Digital audio provides significant benefits over traditional analog audio recording, including more ease and precision in editing, easier addition of special audio effects, and the elimination of sound quality degradation in successive generations of recordings. Digital audio can also be stored in a computer memory and read directly to provide instant random access to any point on the program, For all of these reasons, digital audio workstations are common in the video and film industries.

The basic process of editing a video or film program with digital audio generally begins with the production of a video program with preliminary audio tracks. The program is then taken to a digital audio workstation, where more tracks are added, sound effects are built, and the existing tracks are cleaned up. At this stage, in contrast with the first, video-based stage, the audio editing is done in a more narrow and precise time frame than the one-thirtieth second period of an individual video frame or the one twenty-fourth second period of a film frame; therefore, the editing is known as "sub-frame" editing. Finally, in the last stage of the audio production, the program receives the final mixing and "sweetening" of the audio tracks.

It is the second and final stages of this process in which the invention is most useful. Those stages and the sub-frame precision they require, necessitate close interaction of the audio editing with the video portion of the program. The editing typically requires, among other things, synchronization of the audio effects with the action in the video program. As noted above, if the digital audio program is stored in a computer memory, it can be accessed immediately, greatly facilitating this editing process. (United Kingdom patent Application No. 2,245,745 discloses an application of this capability.) However, with current systems the video program is stored on a normal video tape recorder, which requires a great deal of time to rewind or fast-forward to the desired editing point and must be pre-rolled to its full speed for precise editing. Hence, the potential editing speed and convenience of the digital audio process is held back by the use of conventional video recording.

SUMMARY OF THE INVENTION

The invention disclosed herein takes full advantage of the potential of digital audio editing by combining it with integrated digital video capabilities. The invention is a digital audio workstation that provides the necessary facilities to store digital audio information and edit it with the required time precision. The basic editing precision for digital audio is generally the digital sampling period (usually approximately one-forty-thousandth of a second), and is in any case much less than the one-thirtieth of a second for a full video frame. The invention adds to this digital audio editing capability the ability to digitize, store and display video information as well. It can detect an operator's indication of a point or segment of audio information and use it to retrieve and display the video images that correspond to the indicated audio programming.

Generally, the video information displayed will be from the same time point or segment as the indicated audio information. However, the invention also allows the operator to indicate a time offset, in which case the video information displayed is offset from the indicated audio information by the time period indicated by the operator.

In any event, the video information is displayed essentially immediately upon the indication of the associated audio information by the operator. This is the key advantage of the use of digital random access rather than linearly stored video signals.

The speed and random access of digital video retrieval allow several useful capabilities in preferred embodiments of the invention. For example, the invention can repeatedly play a segment of the video information while allowing the operator to move the audio segment associated with that video segment forward or backward in time so as to synchronize events in the audio and video segments. Another useful feature is the invention's ability to repeatedly play a segment of the video information while successively playing different versions of a segment of the audio information associated with that video segment so as to enable the operator to choose the best version of that audio segment.

Preferred embodiments of the invention also provide additional audio capabilities. The workstation includes a visual timeline that displays the waveforms of the audio information. This feature provides a visual representation of the overall audio program for the convenience of the operator. The preferred embodiment also provides fast and intuitive means of editing the audio segments by using computer user-interface techniques of cutting, pasting, and dragging.

Finally, another aspect of the invention is a labeling and notation system for recorded digitized audio or video information. The system provides a means for storing in association with a particular point of the audio or video information a digitized voice or textual message for later reference regarding that information. This aspect of the invention can be thought of as the equivalent in recording of adhesive-type notes in paper documents.

BRIEF DESCRIPTION OF THE DRAWINGS

For a better understanding of the present invention, together with other and further objects, advantages and capabilities thereof, reference is made to the accompanying drawings, which are incorporated herein by reference and in which:

FIG. 6 shows the locator window used in the display screen of the digital audio workstation;

FIG. 7 shows the record settings window used in the display screen of the digital audio workstation;

DESCRIPTION OF THE PREFERRED EMBODIMENT

Digital recording of audio and video information has significant advantages over conventional analog recording. Although these advantages include greater precision and flexibility in the editing process, the primary benefit when video and audio are stored on digital random access media is probably the nearly instant access to any program point. Conventional recording generally stores material linearly, typically on a magnetic tape, as with a video tape recorder. Therefore, to access a particular point on the recording, the tape must be moved to that point. Digital recording, in contrast, allows the recorded information to be stored in a computer memory, where it can be accessed at random with negligible delay.

Although digital audio workstations are available which take advantage of the benefits of digital recording for audio programs, such systems remain tied to conventional linear recording for the video portions of their programs. The digital audio workstation disclosed herein uses the immediate random access possible with digital video storage to provide immediate display of the appropriate video portion of a recorded program when the audio portion is being edited. The invention eliminates the need for the editor to wait for a conventional video tape recorder to reach the correct position. This allows the editor to work more quickly and, in addition, allows the introduction of capabilities not available with current systems, as described in the following paragraphs.

The invention is a computer-based system similar in some respects to currently available editing systems. It has the typical structure of a general-purpose computer, with a central processing unit, memory, and various means for interacting with an operator. This general configuration is well-known in the art and is typified by commercially available systems such as the Avid Media Composer, manufactured by Avid Technology, Inc., Tewksbury, Massachusetts (which, however, is largely a video, rather than audio, editing system).

Figure 1:
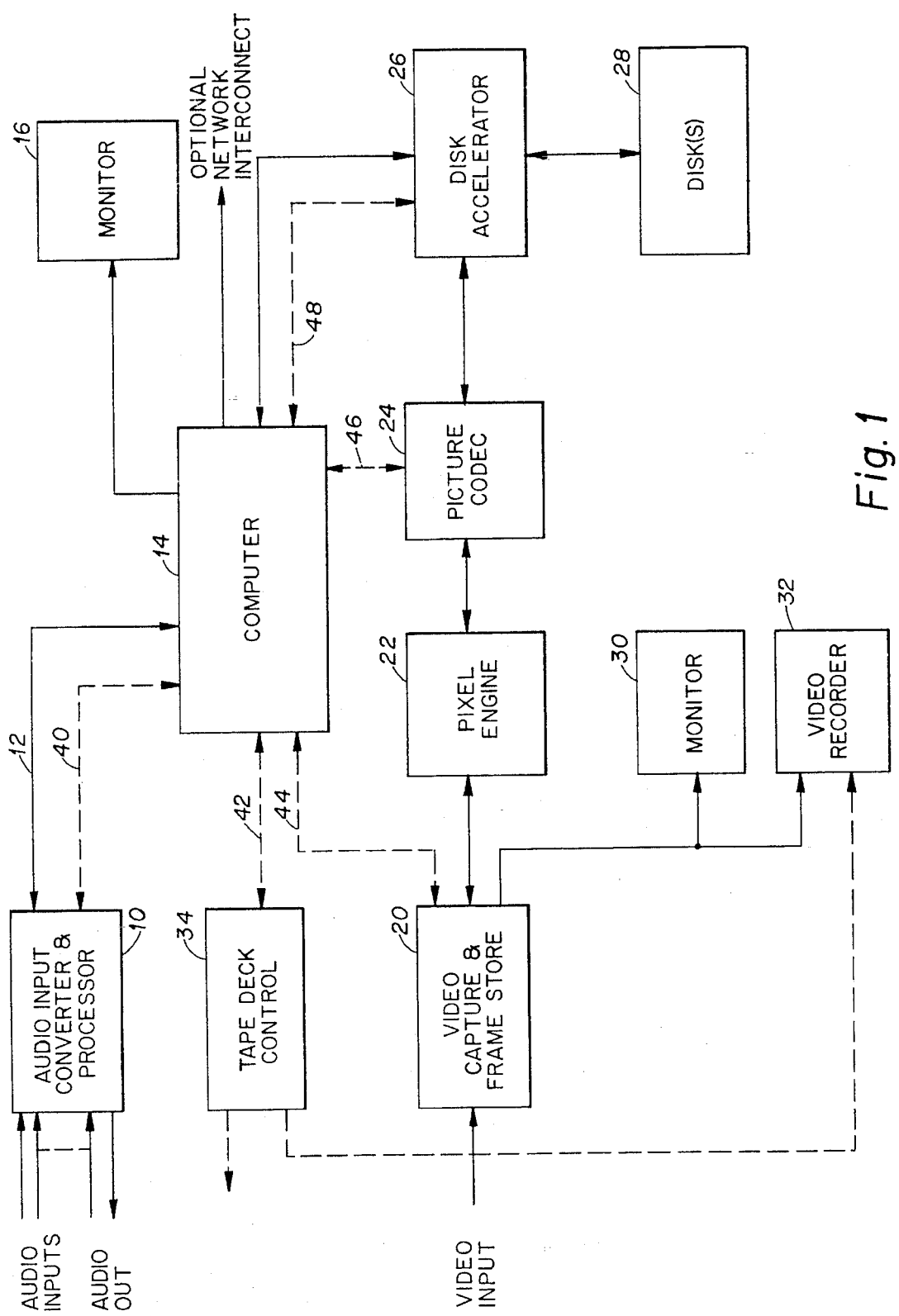
FIG. 1 is a block diagram of a digital audio workstation in accordance with the invention.

A block diagram of a digital audio workstation in accordance with a preferred embodiment of the invention is shown in FIG. 1. Multiple audio inputs, which may be analog or digital, are supplied to an audio input converter and processor 10 from a multitrack audio recorder and playback unit (not shown). The audio input converter and processor 10 can, for example, be supplied by Digidesign. The output of the audio input converter and processor 10 on line 12 is a stream of digital audio information supplied to a computer 14. The computer 14 can, for example, be an Apple Macintosh IIx, IIfx or Quadra 950. The computer 14 is connected to a monitor 16, typically having a 19 inch display screen.

Video input information is supplied from a video playback unit (not shown) in NTSC, PAL or other format to a video capture and frame store unit 20. The video capture and frame store unit 20 can be a Nuvista unit from Truevision. Digital video information is supplied through a pixel engine 22 and an expander/compressor 24 to a disk accelerator 26. The pixel engine 22 is described in application Ser. No. 07/807,433 (now U.S. Pat. No. 5,309,528) filed Dec. 13, 1991 and in U.S. Pat. No. 5,045,940, issued Sep. 3, 1991 to Peters et al, which are hereby incorporated by reference. The expander/compressor 24 compresses and decompresses video information as described in copending application Ser. Nos. 07/807,433, filed Dec. 13, 1991; (now U.S. Pat. No. 5,309,528) 07/807,117 filed Dec. 13, 1991; and 07/807,269 filed Dec. 13, 1991 and by G. K. Wallace in "The JPEG Still Picture Compression Standard", *Comm. of the ACM,* April 1991, Vol. No. 4, pages 31–44, which are hereby incorporated by reference. The expander/compressor 24 is preferably implemented using a CL-550 processor from C-Cube. The disk accelerator 26 is an optional component of the digital audio workstation and can, for example, be a type SCS1-2 accelerator from ATTO Technology. The disk accelerator 26 transfers video and audio digital information to and from one or more disk storage units 28. The disk storage unit 28 can be a Winchester type magnetic disk available, for example, from Micropolis, Maxtor and Hewlett Packard, or an MO or phase change type optical disk available, for example, from Panasonic, Sony and Maxoptics.

The video capture and frame store unit 20 supplies video information to a monitor 30 which, for example, have a 19 inch display screen. The video information supplied to the monitor 30 can also be supplied to an optional video recorder 32. A tape deck control unit 34 supplies control signals to the multitrack audio recorder and playback unit and to the video recorder 32. As indicated by dashed lines 40, 42, 44, 46 and 48, the computer 14 controls the components of the digital audio workstation.

The digital audio workstation shown in FIG. 1 is used for audio editing and permits viewing of the video information that is associated with the audio. The synchronization of audio and video information is essentially as described in U.S. Pat. No. 5,045,940. Multiple audio inputs are applied to audio input converter and processor 10 and are converted to digital audio, if necessary. Optionally, the digital audio can be compressed. However, the digital audio is typically not compressed. The video information is also converted to digital format, if necessary, and is compressed by the picture codec 24. A preferred form of compression and decompression is JPEG. The digital audio and video information is stored on disk storage unit 28 in a process that is the reverse of that described in U.S. Pat. No. 5,045,940. The stored audio and video information can then be read from the disk storage unit 28 for editing and other operations performed by the digital audio workstation, as described below. The system provides essentially "instant" access to the video and audio information, as compared with prior art systems which required winding of video tapes to access desired video segments.

The user interface for controlling operation of the digital audio workstation is illustrated in FIGS. 2–9. Information is presented to the user using windows display technology. Various windows on the display screen contain information relating to various information of interest. Control operations are performed by using a mouse to position a cursor on a desired selection and then clicking the mouse on the desired selection. Other mouse operations are described below.

Figure 2:
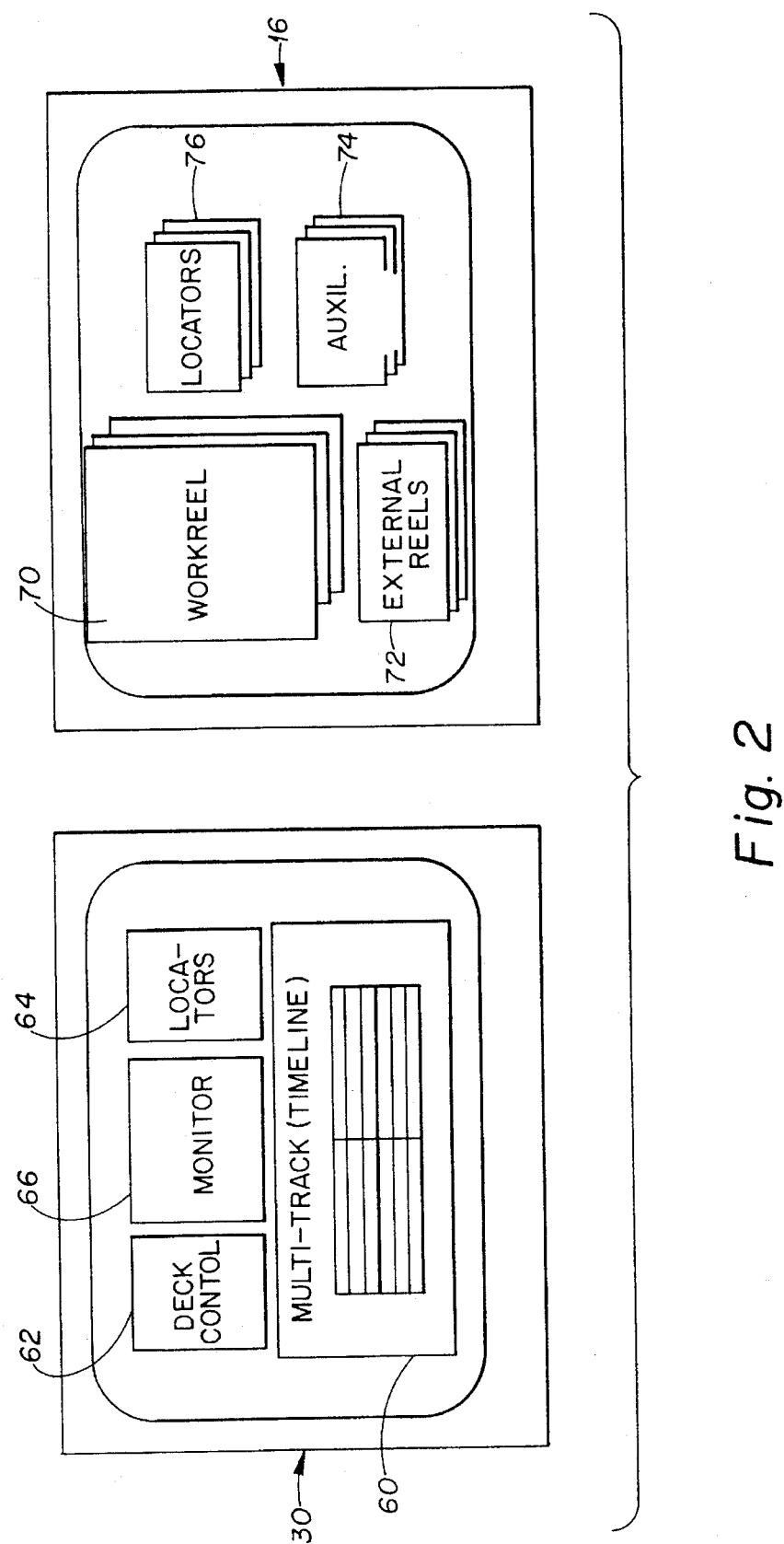
FIG. 2 shows the display screen organization used in the digital audio workstation.

The components of the display screen on monitor 30 are shown in FIG. 2. A timeline window 60 shows the current timeline and contains controls for track select, output enable, record enable, track safety and ganging of audio tracks. A deck control window 62 controls the operation of the multitrack audio player. The deck control window 62 includes buttons for play, stop, record, etc., as well as mark in and mark out locations. It also contains controls for being time code master, slave, or local. A locator window 64 is used to store points of interest within the multitrack timeline and allows fast access to up to 100 user defined points within a sequence. A monitor window 66 shows the output of the video track.

The display screen of the monitor 16 contains the window elements shown in FIG. 2. A workreel window 70 is used to hold audio clips as well as sequences within edited video and audio. An external reels window 72 shows external or library reels that have clips and sequences that can be auditioned and imported into the workreel. Auxiliary windows 74 are used for miscellaneous operations as described below. A locator window 76 is similar to the locator window 64 described above.

Figure 3:
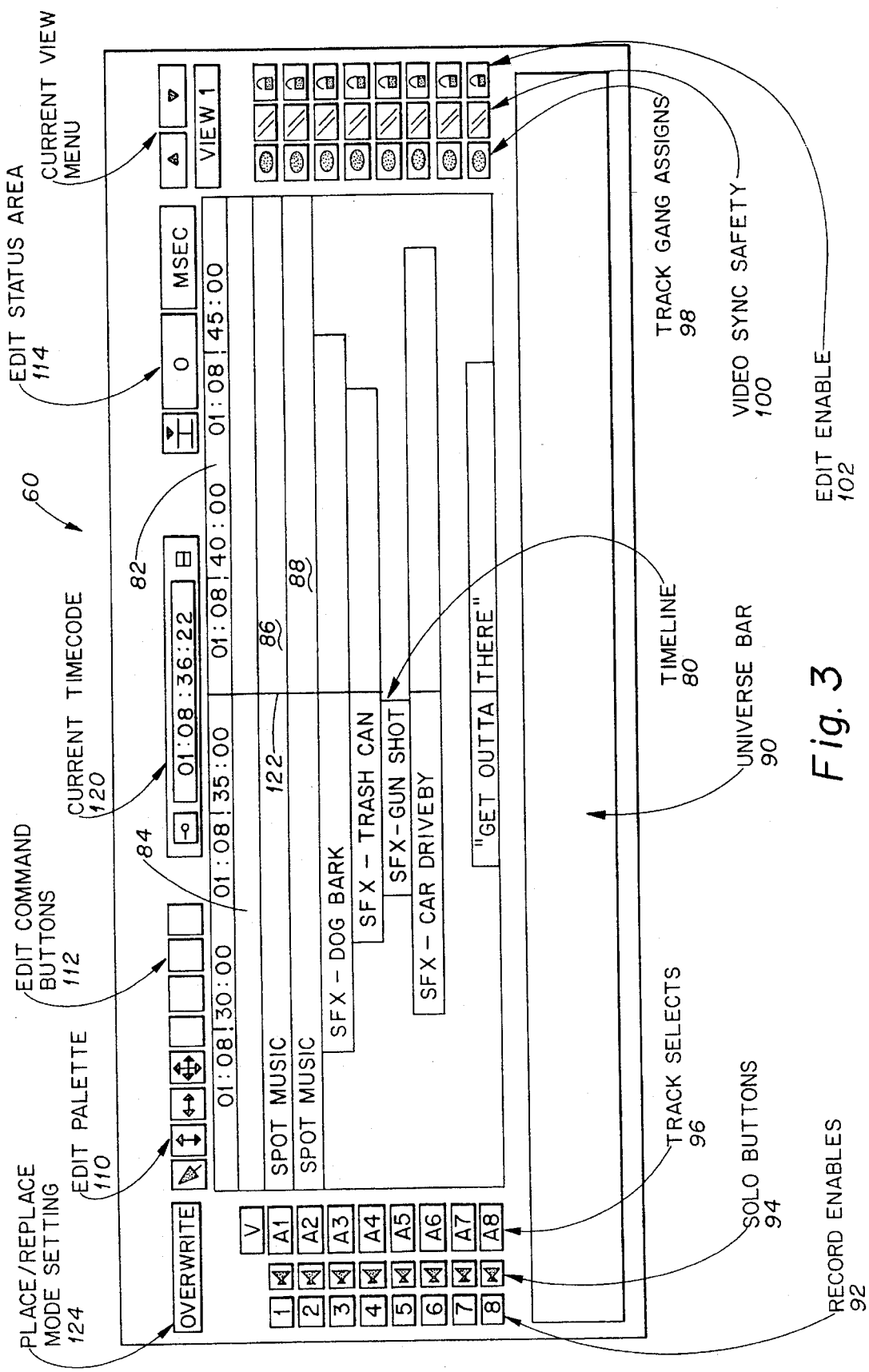
FIG. 3 shows the timeline window used in the display screen of the digital audio workstation.

The timeline window 60 contains a number of separate elements as shown in FIG. 3. A timeline 80 gives a graphical representation of the sequence currently being edited. Timeline 80 includes a time code track 82, a video track 84 and eight audio tracks 86, 88, etc. The timeline 80 is a scrolling Timeline. Clips move under a current position bar 122. The direction of scrolling representing normal forward playback is a user preference. The timeline 80 displays the top eight currently assigned audio tracks of an N-channel player. The time code track 82 can be used to go to a location visible in the current timeline view. Clicking in the time code track locates to that location. Dragging causes the timeline to scroll. Mark in/mark out values in the deck control window are indicated on the timeline by vertical dashed lines.

A universe bar 90 is located under the timeline 80. The universe bar shows the current position within the entire sequence. Clips are represented by single pixel high lines in the universe bar. The user may click into the universe bar 90 to instantly locate to any position within the current sequence. The universe bar current-position line may be dragged from its current location to allow rough scrolling.

Record enable buttons 92 indicate which tracks are enabled to record. As used herein, the term "buttons" refers to buttons that appear on the display screen and can be selected by use of the mouse as described above. Different colors indicate play, enable and currently recording. When the deck is stopped, clicking on these buttons toggles between play and enable. When play mode is entered, clicking on an enabled button begins recording on that channel. Solo enable buttons 94 disable the output of the deck. Clicking on a solo button when one or more of the other solo buttons are enabled causes this button to be enabled and the other solo buttons to be disabled. If none of the other buttons is enabled, then all tracks are enabled. Track select icons 96 are pop-up menus with text values ranging from A1 to A24 for choosing which logical track is played on which physical channel. The track select icon for the video track contains the selections V and V+G for projects that Incorporate graphics. Graphic overlays may be represented on the video timeline.

Track gang buttons 98 are used to lock audio tracks together for synchronization safety. Each track may be assigned a gang letter from A to H by using a pop-up menu. Selecting a region in a track that is ganged to another track causes the same region of the ganged track to be selected as well. There is no gang assignment for the video track. Video sync safety buttons 100 prevent the following operations on tracks where this function is enabled: (1) placement of clips while in track insert mode; (2) replacement of regions while in track insert mode; and (3) all alignment operations. Edit enable buttons 102 enable or disable editing on a track to prevent accidental editing or recording onto a finished track. The following operations are enabled when a track is enabled: selection of regions in the track and copying of regions out of the track.

An edit tools area is located above the timeline 80 and contains buttons for creating and modifying edits on selected tracks in the timeline. The edit tools include an edit palette 110, edit command buttons 112 and an edit status area 114. The edit palette 110 allows timeline editing to be performed in one of several modes. Each palette mode is indicated by a different icon. Palette modes include: (1) "select" for selecting regions in the timeline edit; (2) "track shift" for moving a selected region vertically to another track; (3) "align" for moving a selected region horizontally in time; and (4) "move" for moving a selected region vertically and/or horizontally. The edit command buttons 112 operate on regions of the timeline that have previously been selected. The edit command buttons 112 include: (1) "cut" for removing the selected region and joining the ends; (2) "lift" for removing the selected region and not filling the space; and (3) "add edit" for causing an edit to be made at the current position on the selected tracks. The edit status area 114 allows editing of transition parameters and includes the following functions: (1) "crossfade position sets whether a crossfade happens before, in the middle, or after the transition time code; (2) "crossfade time" sets the length of the crossfade; and (3) "crossfade midpoint" sets the midpoint attenuation of the crossfade function, from −6 db to −3 db in 0.5 db increments.

Figure 4:
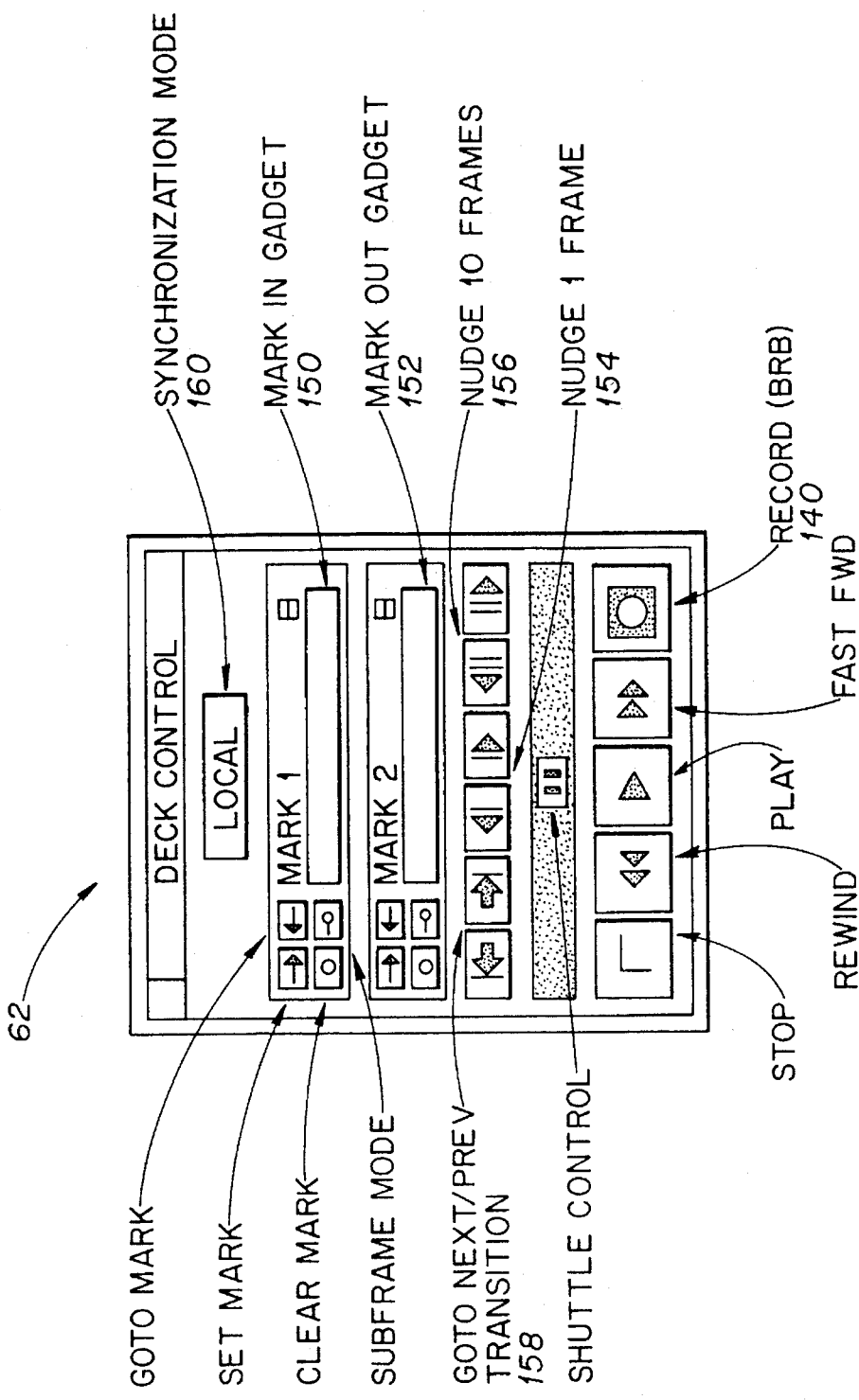
FIG. 4 shows the deck control window used in the display screen of the digital audio workstation.

Timeline window 60 also includes a current time code display 120 located above the current position bar 122. The time cede display 120 is subframe accurate in that there is a two digit subframe number appended to the frame number. A place/replace mode setting menu 124 indicates the current placement mode when there is no selected region in the timeline and the current replace mode when there is a selected region in the timeline. With no region currently selected in the timeline, the menu 124 permits selection of one of the following modes: overwrite placement, track insert placement and clip insert placement. When a region is selected in the timeline, the menu 124 permits selection of one of the following replace modes: fill replace, track insert replace, clip insert replace, loop replace and loop inverse replace. The deck control window 62, shown in FIG. 4, is used to control the multitrack audio recorder. The deck control window includes play, record and stop controls, mark in/out time code displays, various "nudge" functions for modifying the current timeline position and a synchronization mode selection 160. The synchronization mode selection allows local, master and slave modes of synchronization. The main feature of the deck control is a set of standard motion control functions including play, stop, shuttle, fast forward and rewind.

The play button is unique in that it implements a menu of play modes. There is also a "big red button" or record button 140 for entering record mode, which is separate from the record enable. The enable selects which tracks to record. The record button causes the machine to go into and out of record mode. The play button menu contains the following play modes: (1) "play" for standard play operation; (2) "play in-out" plays from mark in to mark out; (3) "rehearse" plays through the current position with preroll and postroll; (4)

"rehearse postroll" plays from the current position to postroll; and (5) "rehearse preroll" plays from preroll to current position. The play button menu changes when the record button is in record mode to allow the selection of one of the following recording modes: (1) "record" for standard record operation; (2) "record in-out" records from mark in to mark out; (3) "loop record" used to enter loop record mode; and (4) "log" used to set up a logging session. During a logging session, no media files are recorded, and offline clips are generated.

The mark in and mark out time code displays 150 and 152 are subframe accurate in that there is a two digit subframe number appended to the frame number separated by a decimal point. The deck control window 62 also includes nudge one frame buttons 154 and nudge 10 frames buttons 156. A transition to edit is selected by using go-to-transition buttons 158. The go-to-transition buttons 158 only apply to selected tracks when one or more tracks are selected. The selected transition is highlighted by changing the color of the timeline centerbar on the selected transition's track. If there is more than one transition at that location, the user must hit the go-to-transition buttons repeatedly to select the desired transition. If track is ganged to another track, then the transition for the ganged track is selected as well.

The deck control window 62 includes a pop-up menu 160 to select one of the following synchronization modes: (1) "local" in which the system operates locally with no attachment or synchronization to any other external device; (2) "master" in which the system sends out commands to external decks to cause them to be synchronized to the system; and (3) "slave" in which the system follows an external time code. The local mode is the default mode. In this mode, the deck control operates locally upon the digital sequence represented by the timeline. In the master mode, an external deck locks itself to the system. In the slave mode, the system and an external deck are in sync. However, the external deck controls the system.

The monitor window 66 is the simplest, since it contains only the video track at the current position of the timeline. There are no controls in the monitor window. While playing the sequence or any portion of the sequence, the monitor window displays frames in rapid sucession, thus creating a moving picture.

Figure 5:
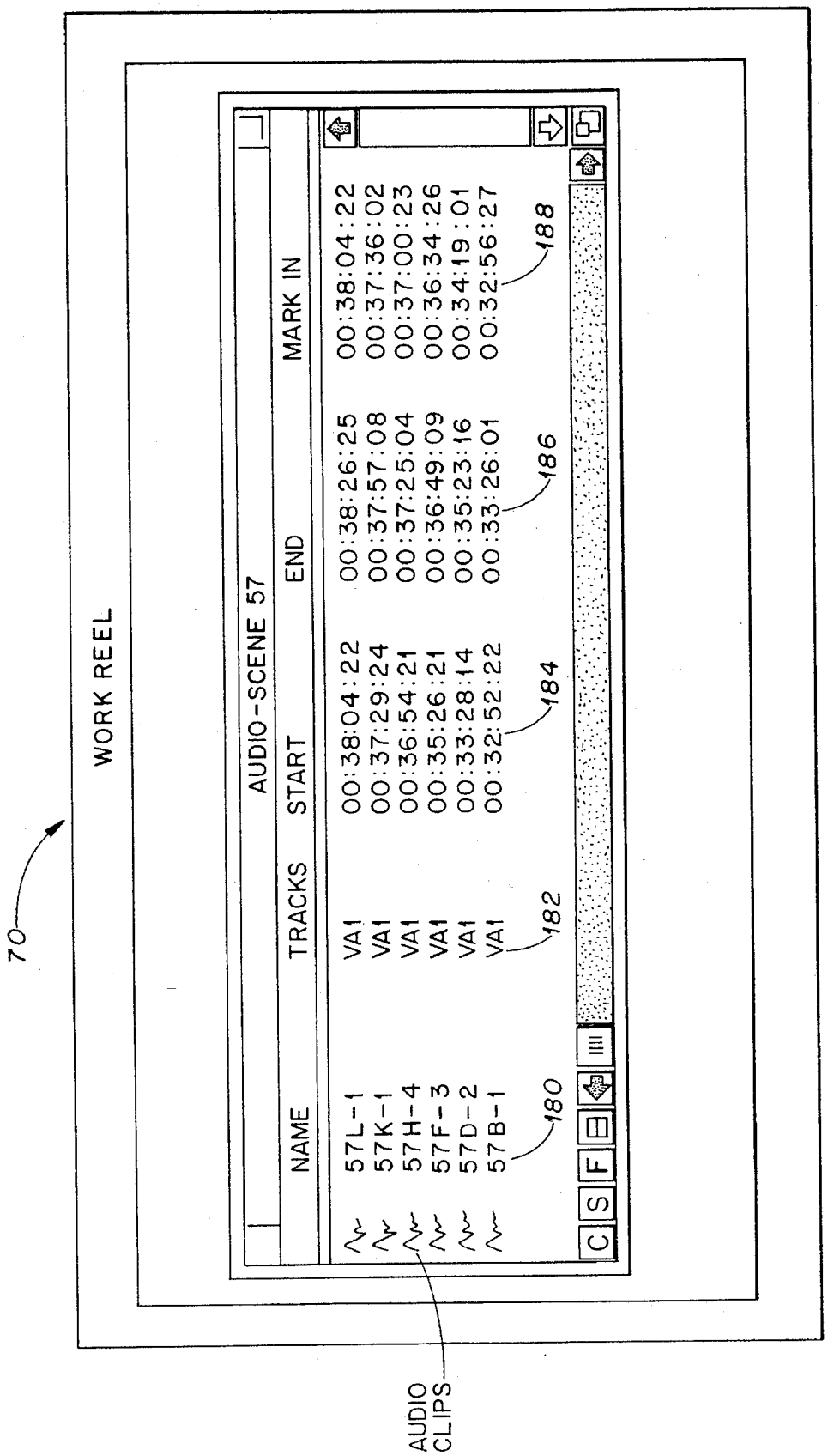
FIG. 5 shows the workreel window used in the display screen of the digital audio workstation.

The workreel window 70, shown in FIG. 5, contains a list of audio and video clips. Audio clips are represented in the window with a waveform icon followed by the following information: (1) the name 180 of the clip, (2) the number of tracks 182, (3) sample rate (not shown), (4) duration (not shown), (5) the start time code 184 and end time code 186, (6) a mark in point 188 and a mark out point (not shown), (7) a sync point (not shown), (8) the physical audio channel the clip was recorded from (not shown), and (9) optional comments. Those fields not visible at any particular time can be found and made visible by scrolling the window contents horizontally by clicking the scroll bar below the window. Clips are placed in the timeline by click dragging them from the workreel window into the timeline window. This is the basis for all placement operations. Double clicking on a clip in a reel causes it to play out of the channel it was recorded into. This allows clips in the workreel to be rehearsed before placement.

The locator window 64, shown in FIG. 6, is used for marking points of interest in the timeline. There are 100 locators available. Locators are different from marks in that marks are used for editing operations, whereas locators are used simply for getting around. Another use for the locator is for setting up punch in and punch out points for record and automatic dialog replacement. The format of the locator window 64 is generally as follows. The fields in the locator window include locator number 202, time code value 204 for each locator and a field 206 for comments. The user can go to a location defined by a locator by the following methods, (1) by double clicking on a locator in the locators window; (2) by using the next locator button and the previous locator button in the deck control window 62; (3) by hitting the tab key on the keyboard to go to the next locator after the current position or shift-tab to go to the locator before the current position; and (4) by entering a locator number on the numeric keypad of the workstation keyboard. The user can set a locator by the following methods: (1) select the time code field of the locator in the locator window and enter a time code value; (2) click the set locator button on the deck control window which sets the lowest-numbered unused locator to the current time code value; (3) use the keyboard to set the lowest-numbered unused locator to the current time code value; and (4) double click on a locator in the window to set that locator to the current time code value. Locators appear on the timeline as marks over the time code track.

The auxiliary windows 74 include: (1) an audio window that contains meters for setting input levels and fader controls for setting clip output levels; (2) a record settings window that allows various digitizing parameters to be set prior to recording audio and/or video; (3) an external deck control window to control any external decks and to set the time code offsets for master mode; (5) a clip editor window, invoked by double clicking on a clip in a reel, that allows the user to set in, out and sync points and to create subclips; and (6) a video tool window that allows video parameters to be adjusted prior to recording video.

The audio window contains audio bar graph meters for each of the 4 or 8 output channels of the timeline, input/repro switches which allow the output mode of each audio channel to be selected ("input" means monitor the A/D input and "repro" means monitor the disk output) and faders for setting the level of the current clip for each channel in the timeline. The function of each meter depends on the input/repro mode. In input mode, the meter is an input meter; in repro mode the meter is an output meter.

A record settings window 220 is shown in FIG. 7. The record settings window allows the current record settings to be set. This window permits setting the workreel into which to record, setting the video resolution, setting the disk drives to record onto and the channel selected for recording.

Figure 8:
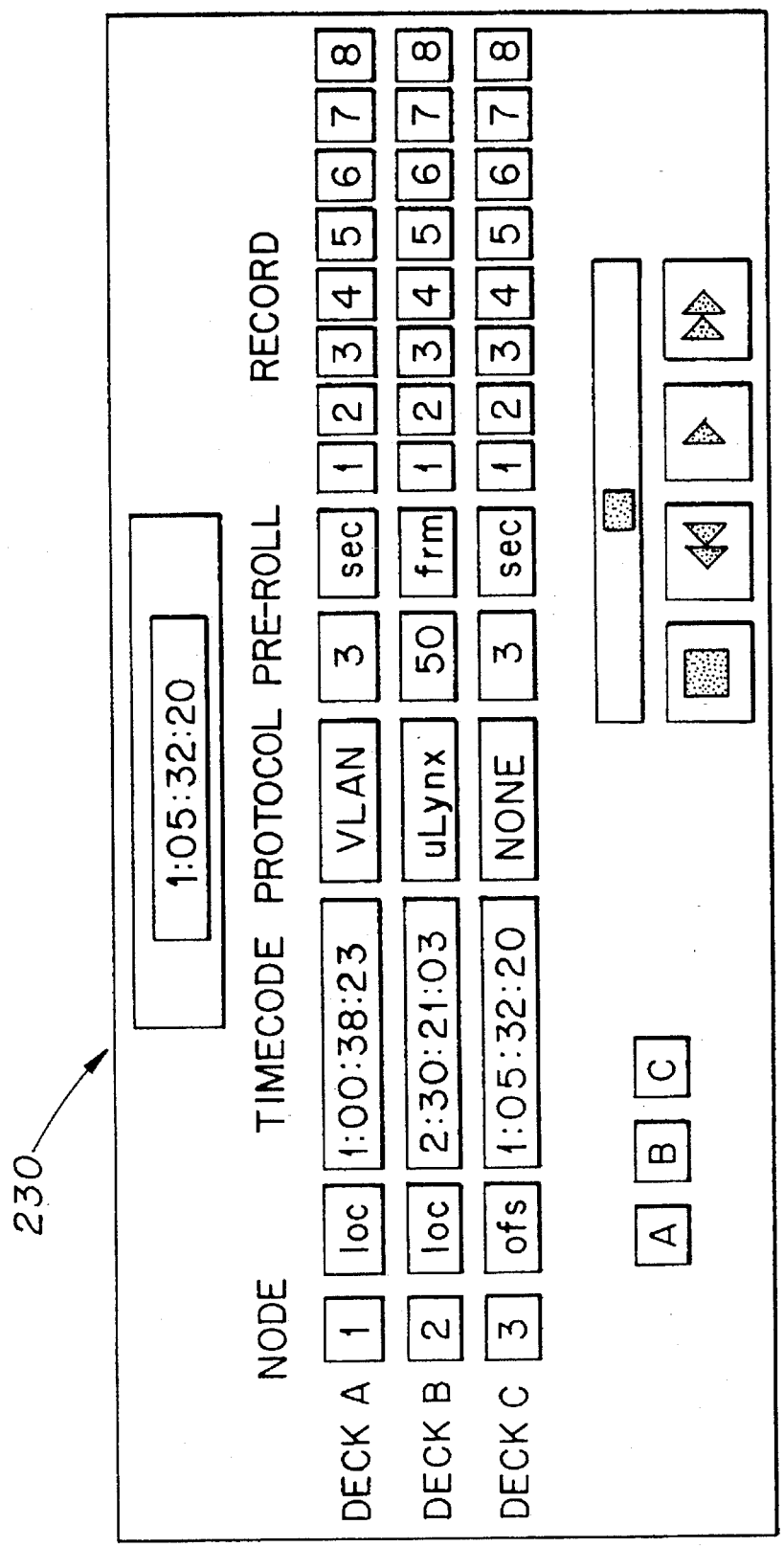
FIG. 8 shows the external deck control window used in the display screen of the digital audio workstation.
Figure 9:
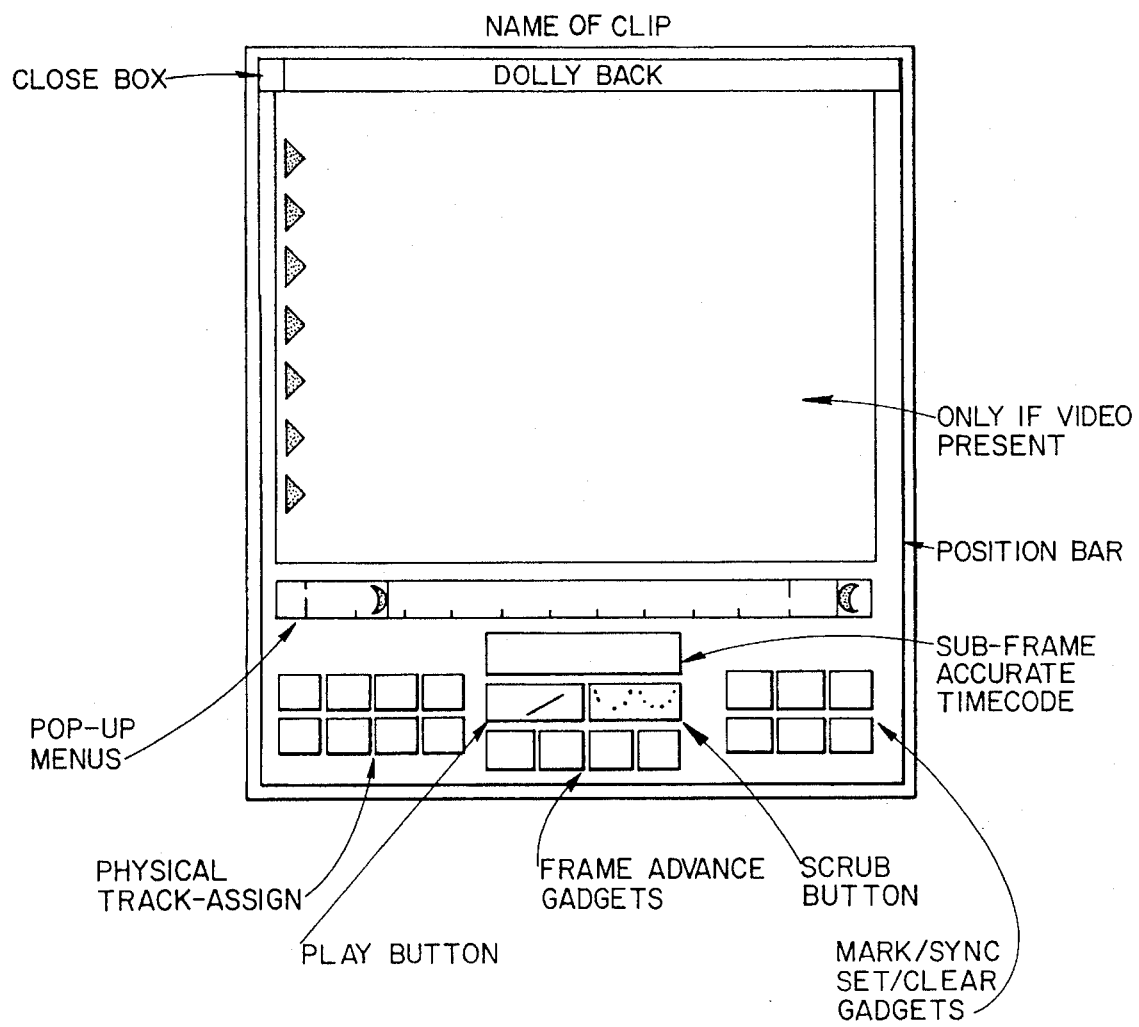
FIG. 9 shows the clip editor window used in the display screen of the digital audio workstation.

An external deck control window 230 is shown in FIG. 8. The external deck control window permits the position and locked offset of external decks to be set up and controlled. The external deck control window permits up to Three external decks to be controlled. Separate motion control buttons for positioning the external deck with respect to the current system time code are provided. The current time code or the offset from the system time code track are displayed. A clip editor window is shown in FIG. 9. The clip editor window is invoked when the user double clicks on a clip in a reel. This window allows the user to set the mark in and mark out points and the sync points for the clip. In operation, the memory of the workstation's computer is first loaded with the digitized tracks of video and audio information for the program. Then the workstation responds to the editor's commands, in the manner known in the art, to adjust the levels of the various tracks, add new audio information from prerecorded libraries, mix the audio from various tracks, etc. Since it is a digital workstation, the editor also has the capability to move audio from one track to another or forward or backward in time. This can be accomplished in several different ways known to those skilled in the art, but a preferred approach is to use the cutting, pasting, and dragging functions familiar from Macintosh and Windows-based computer systems. With these techniques, for example, the computer monitors the editor's movement of a cursor on the computer screen and reads the cursor's position on the audio display to determine, using methods known in the art, the time segment of the audio signal that The editor is referencing. The computer then monitors similar cursor movements to determine the time location, in that or another signal, to which the editor would like to move that audio signal segment. The precision of digital audio workstations is one of their key advantages, and both conventional workstations and the apparatus of the invention can typically edit audio waveforms to a precision of approximately one-forty-thousandth of a second (the digital sampling time), or in any event much less than the one-thirtieth of a second for a full video frame.

It is in its control of video information that the invention differs from conventional digital audio workstations. Whereas conventional systems use a video tape recorder to view the video images than correspond to a given audio segment, the invention uses a video recorder only once: to play the original video program so it can be digitized and stored in the computer. (This is accomplished using Techniques known in the art and commercially available, as for example from Avid Technology, Inc., Tewksbury, Mass.) Alternatively, the invention can use previously digitized information. Using the video signal in digital form allows the video information no be accessed immediately, just as the audio information is. The video information is stored with a time code that is preferably, though not necessarily, the same as that used for the audio information. The workstation computer searches the digital video file for the time code of interest, and retrieves the video image snored with that particular time code.

Immediate access to video information has several uses. The most basic is in a simple editing process such as synchronization of audio events to video ones. With conventional systems, the editor needs to rewind or fast forward the video player to a point prior to the event of interest, start the player so it has time to reach its proper speed, and then adjust the relationship of the audio and video signals. After any editing of the audio, the process needs to be repeated, and the required forward and reverse winding for each iteration of this process takes a a great deal of time. The present invention eliminates this winding time by providing direct access to the video. For example, if the editor indicates, by, for instance, using a computer mouse to place a cursor on the display a point in the audio program, the computer can use methods known in the art to translate the cursor position to a time reference. The computer can then search for the same time reference in the video file to access the corresponding point in the video program, and display the video image for the indicated point immediately on the screen. Another possibility is for the editor to indicate a segment, rather Than a point, of the audio waveform (using, for example, the same well-known mouse-based method of user interaction) ; The workstation would then immediately display the video sequence for that audio segment. Moreover, the displayed video does not need to be that from The same time as The audio; in could just as easily be the video programming from, for example, one second before or after the indicated audio if such a display were useful to the editor.

The combination of digital video and digital audio in the digital audio workstation of the invention also allows more sophisticated techniques. For example, the editor can indicate beginning and ending times for a program segment, and the system can repeatedly replay the video sequence for that segment. Then the editor can request the system to move the audio program forward or backward in time by short increments to obtain the best synchronization of the audio and video. (The workstation computer can, for example, request and receive operator input from a keyboard or other device regarding The desired amount of time shifting.) It is the digital video system's ability to provide repeated comparisons over a short time that allows the editor to use this technique; the delay in rewinding a conventional video recorder would make it impractical at best.

Another somewhat similar technique also relies on repeated playing of a particular video sequence. However, instead of repeatedly playing the same audio sequence (moved in time) with the video, different takes of the same audio events can be played to determine which is the best match for the video. This technique allows direct comparison of the different takes, and, again, with the invention the immediate access time makes the process much more useful.

Yet another feature of the invention can be used with either audio or video information. This feature takes advantage of the nonlinear nature of digital data storage in a slightly different way. Since the time structure of digital data storage is not tied rigidly to the movement of a tape, it is possible to introduce interpolations in the data without interrupting the playback of information. This can be done, for example, by storing the interpolations in the digital data stream, but surrounded by codes indicating that the information between the codes is not to be interpreted as part of the audio or video data. The invention uses this capability to allow storage of notations with the data. More specifically, the editor can store a note regarding the program at a particular point in the program; then, when that point in the program is reached, the notation will appear to the operator, either as text on the screen or as an audio voice message. This permits the use in recording of the equivalent of adhesive-type notes in paper documents. The advantages of this technique are apparent in the ease and speed with which notations can be made for later reference. Like the other aspects of the invention, this feature uses the capabilities of digital media storage to add speed and convenience to the editing process.

Operation of the digital audio workstation is now described in detail. A typical first step is to bring the project to be edited into the system. This can be done by transfer of hard disks from compatible systems, such as the Media Composer sold by Avid Technology, Inc. of Tewksbury, Massachusetts. Alternatively, a sequence file can be transferred by floppy disk, and the video can be digitized from video tape. In another approach, a project may be loaded into the system by importing an edit decision list (EDL). An EDL file is read from floppy disk and is converted into a sequence. The sequence is then automatically digitized. In yet another approach, source material can be digitized from video tape using the record features of the record settings and deck control windows.

When the video and audio for the project are stored in the workstation's memory, it is likely that additional audio source material will be required, such as sound effects, voice overdubs, etc. This can be done by recording into a workreel or recording directly into the timeline as follows. The simplest way to record additional audio is to record into a workreel using the record features of the record settings and deck control windows. Recording audio directly into the timeline is similar to recording to a workreel, except that channels are enabled for recording with record enable buttons located on the timeline.

When the material for a project is brought into the system and is on-line, it must be placed in the timeline before it can be edited. If a sequence already exists, it can be clicked on in the workreel and dragged into the universe bar, thereby possibly replacing a previous sequence that was being edited, If the starting source material exists only as individual clips and not as a sequence then the timeline must be cleared first. The source clip can be dragged from the workreel into the timeline, and a new sequence is automatically created.

Clips from a workreel are placed into a sequence by dragging them from a workreel window into the timeline. When a clip is dragged into the timeline window, an outline appears showing the length of the clip and number of channels. The overlay in the edit status area indicates the track and starting time code location at which the top channel of the clip will be placed. When a clip is placed in the timeline, one of the following edits is performed, depending on the mode selected in the placement mode select area in the timeline: (1) overwrite placement, (2) track insert placement, or (3) clip insert placement.

Figure 10A:
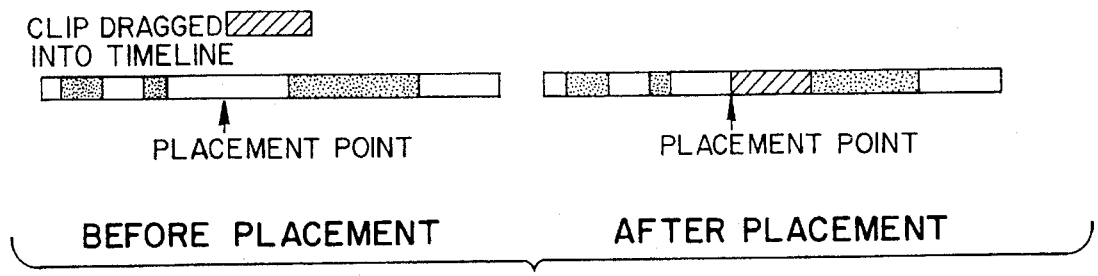
FIGS. 10A–10H illustrate edit operations performed on the display screen of the digital audio workstation.
Figure 10B:
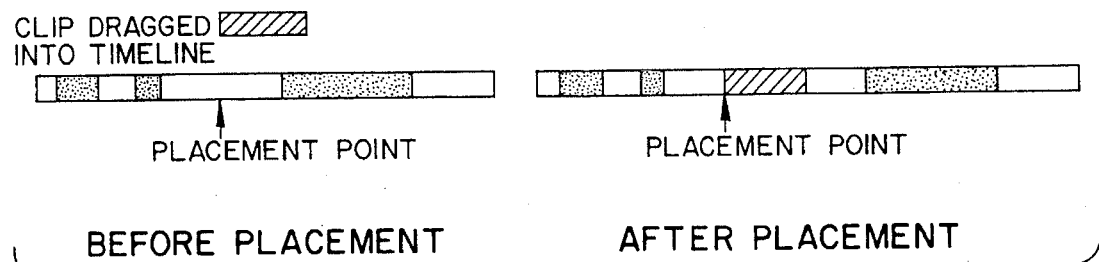
Figure 10C:
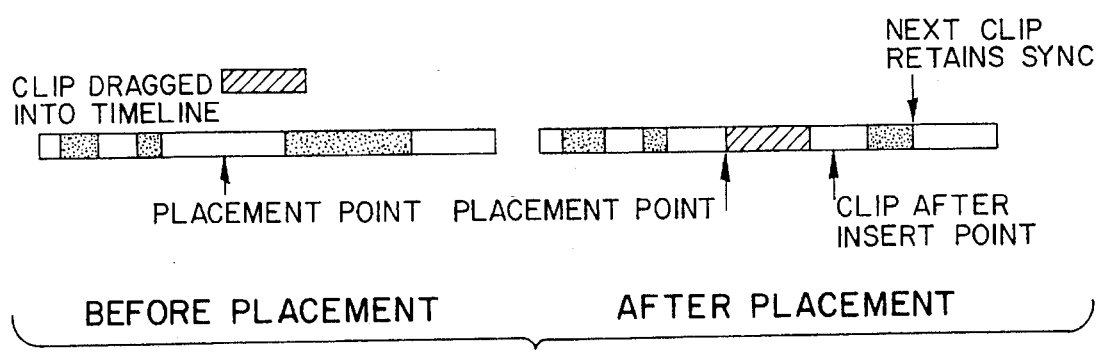

Overwrite placement is illustrated in FIG. 10A. A clip dragged into the timeline overwrites the current material. Track insert placement is illustrated in FIG. 10B. A clip dragged into the timeline is inserted at the placement point, and the material that was originally after the placement point is moved down. Clip insert placement is illustrated in FIG. 10C. A clip is inserted without causing the rest of the clips in the track to ripple down. If the insert point is in silence, then there must be enough silence after the insert point to accommodate the entire clip to be placed, or the operation fails.

Once clips are placed in a sequence in the timeline, further editing can be performed directly in the timeline. Several types of editing can be performed. In order to perform edit operations within the timeline, a desired section to edit must first be selected. A selected region is displayed in the timeline as one or more shaded areas. A selected region can be defined by using the select palette tool to drag select a section. This is done by clicking on a point in the timeline and, while holding the mouse down, dragging the cursor to another location and releasing the mouse. Also, single clicking on a component will select that component. Finally, double clicking on a track between two marks will select the region on that track between the two marks.

A selected region can be aligned by using the align palette tool. The align cursor mode is entered by clicking on the align palette tool. Then, the selected region is clicked and dragged horizontally. There are two special features that can be accessed while the align palette tool is active. Scrub align allows the region to be heard as it passes under the timeline current position bar. Loop/nudge allows the alignment to be performed by entering the relative time code values with the numeric keypad, causing the new alignment to be rehearsed automatically.

Track shifting causes a selected region to be moved to another track. A selected region is aligned by using the track shift palette tool. Move operations allow a selected region to be moved with two degrees of freedom (track and position) . A match cut can be made within a clip by positioning a clip under the timeline current position bar, selecting the clip and pressing the add edit button. A selected region can be removed from the timeline in two ways. A lift button causes a silence gap to be left in place of the selected region. A cut button causes downstream material to shift forward to fill the space.

Replace editing is used to refer to any editing operation that replaces a selected region with another region. Replace editing is implemented by selecting a region on a timeline to be replaced and then dragging a replacement clip from a reel or clip editor window into the timeline over the replaced area. There are several modes of replace editing.

Figure 10D:
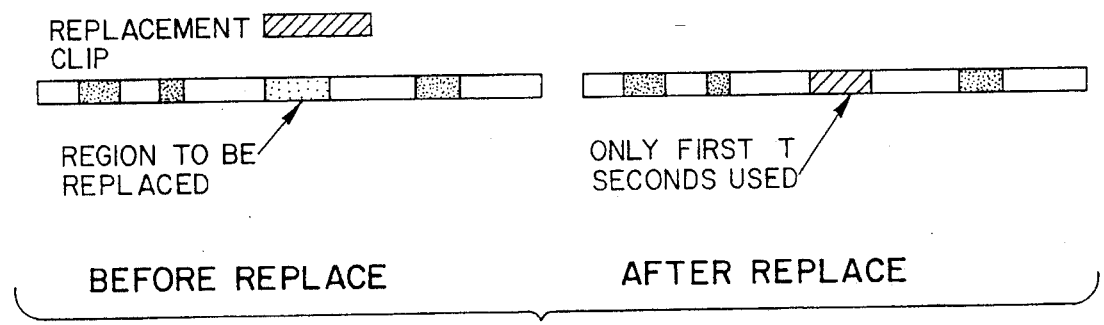
Figure 10E:
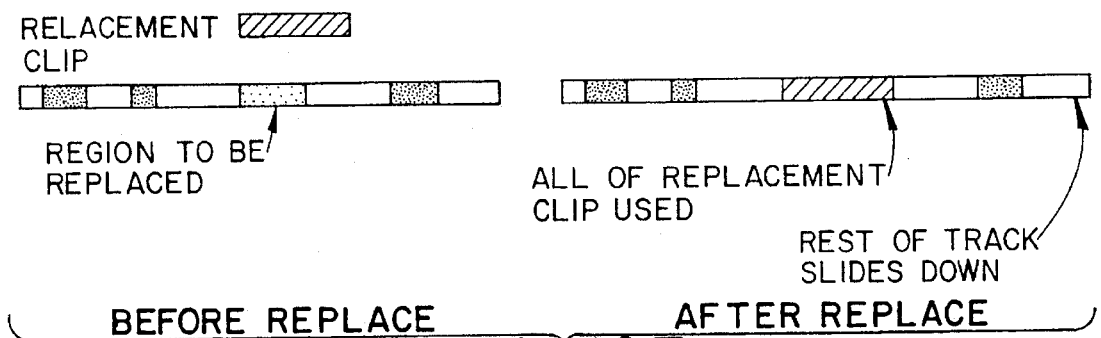
Figure 10F:
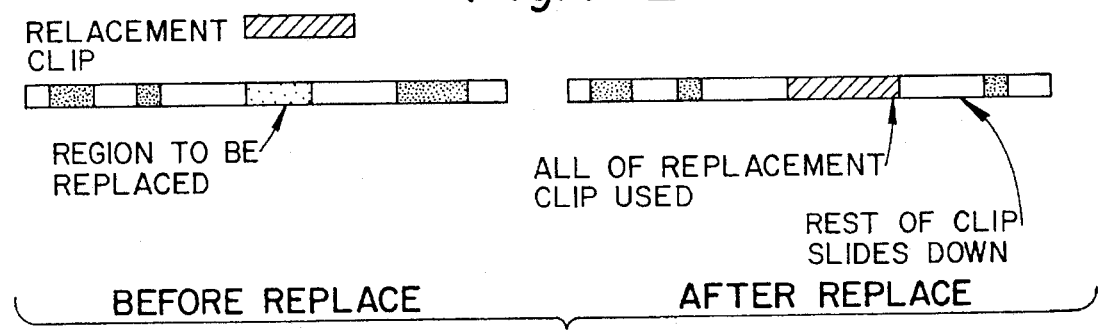
Figure 10G:
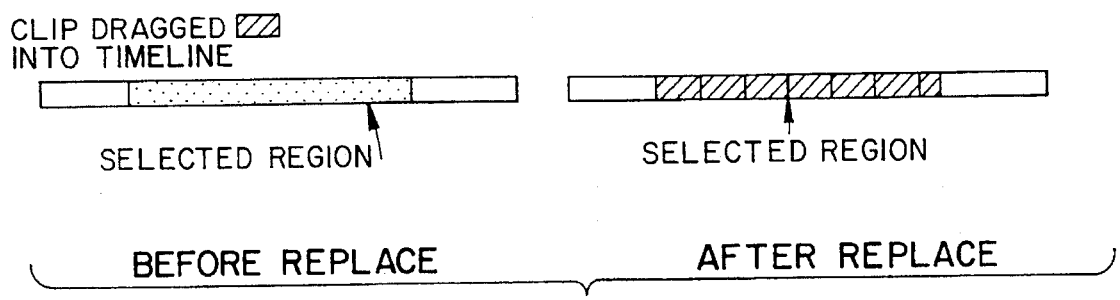
Figure 10H:
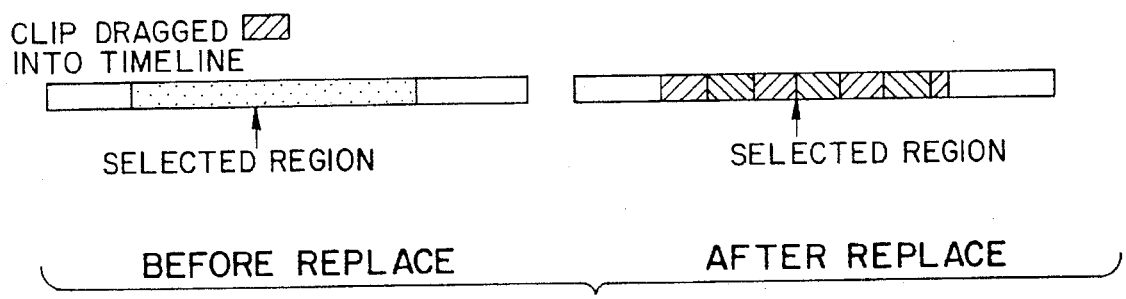

In fill replace editing mode, shown in FIG. 10D, the selected region is replaced with the clip such that the replacement can at most only fill the selected region. If the selected region represents t seconds, only the first t seconds of the replacement clip will be used. If the replacement clip is less than t seconds, silence fills the difference. In Track insert replace editing mode, shown in FIG. 10E, the selected region is replaced by the entirety of the replacement clip. If the replacement clip is of different length from the selected region, the rest of the track after the selected region changes alignment. In clip replace editing mode, shown in FIG. 10F, the selected region is replaced by the entirety of the replacement clip. If the replacement clip is of different length from the selected region, then only the end of the clip after the selected region changes alignment. If the replacement clip is longer than the selected region by t seconds, there must be t seconds of silence before the start of the next clip in the track or the operation is disallowed. Many sound effects involve taking a short sound effect (babbling brook, birds, etc.) and "looping" or repeating it to fill the scene. In "loop replace" mode, a short replacement clip fills a larger selected region by repeating the smaller clip, as shown in FIG. 10G. In some situations, there is not enough source material available to generate a loop without the repetitiveness of the loop being heard. The "loop inverse replace" mode reverses the direction of every other loop (plays the samples in reverse order) , thereby reducing the repetition rate as shown in FIG. 10H.

The digital audio workstation has a loop record mode which is used to build multiple-take clips. This function may be used in automatic dialog replacement (ADR) , replacement of environmental sounds (Foley processing) and foreign language dialog replacement. The process has two phases: cue track preparation and track recording. Track preparation involves marking in and out points for the segments of audio that will be rerecorded. Track recording is the building of multiple take clips by taking each segment iteratively while allowing the user to accept or reject each take and moving to the next segment on demand. Loop record is implemented as a separate window . The loop segment is a clip and the loop record mode loops over clips in one track, called the cue track and records one or more destination tracks. The cue track may simultaneously be a destination track.

The loop record mode may run manually, wherein loop playback starts by pressing the enter key, or automatically, wherein each clip loops automatically. A restart delay is the number of seconds before the loop begins another pass. To begin loop recording one or more tracks, the user selects a region by placing a mark in point and a mark out point, record enables the desired tracks, and presses the record button. Pressing the enter key on the keypad starts the timeline playing at the current mark in minus preroll. The timeline goes into record mode upon reaching the mark in point and records the enabled tracks until reaching the mark out point. At the end of play, the user may press either the plus keypad key, which accepts the current take, or the minus keypad key, which rejects it. After one of the keys is entered, the timeline positions to the current preroll point. In an automatic session, the loop restarts after the user specified delay time. Otherwise, pressing play or the enter key starts the multitrack for another take. Pressing star on the keypad causes the session to move onto the next clip. The current mark out becomes the new mark in. The timeline positions to the new preroll point, and a new set of takes may be recorded.

Beep tones are played before the mark in. The user can specify the number of beep tones to be played, their spacing, their frequency, their duration and their physical output channel.

The loop record mode provides highly efficient ADR and Foley processing. Typically, multiple takes are required to obtain a desired final result. Prior art systems required considerable recycling time between takes because of the requirement to rewind the video tape. Furthermore, unacceptable takes were discarded after each try. Much of the time involved in a session was spent waiting for rewinding of tapes. In accordance with the present invention, virtually instant access to the beginning of video clips is provided, thereby eliminating rewinding delay. Furthermore, multiple takes can be recorded and retained as a coherent group. Each separate Take of the group may be chosen as active and, furthermore, segments of different takes can be combined to provide a desired final result.

The digital audio workstation of the present invention provides a number of highly advantageous features. As described above, this system permits high quality digital audio editing with instant access to the associated picture. The audio can be edited at any point during the associated video frame. Typically, video frames are approximately 1/30 of a second. The audio is typically sampled at a rate of 44.1 kHz or 48 kHz. Audio can be edited at any of the audio sample boundaries and is not limited to the video frame boundaries. The ability to instantly access audio and video, combined with the loop record mode, provides highly efficient ADR and Foley processing, as described above. Multiple tracks of audio information can be layered, with each clip having different start and stop points.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A digital audio workstation comprising:
   a. means for storing digital audio information;
   b. means for selecting a portion of digital audio information at audio sampling times spaced apart by less than one-thirtieth of a second;
   c. a computer-readable randomly-accessible storage medium in which digital video information is stored and is associated in time with the digital audio information;
   d. means for detecting selection by an operator of the portion of digital audio information; and
   e. means for accessing the digital video information based on the selected portion of digital audio information selected by the operator.

2. The digital audio workstation of claim 1, wherein the accessed video information is from an identical time portion as the indicated audio information.

3. The workstation of claim 1, wherein the accessed video information is offset from the selected audio information by a particular time period indicated.

4. The workstation of claim 1, wherein the accessed video information is displayed essentially immediately upon the selection of the associated audio information.

5. The workstation of claim 1, further comprising means for displaying a visual timeline which represents waveforms of the audio information.

6. The workstation of claim 1, further comprising means for indicating segments of the digital audio information on a computer display and for allowing editing those segments by using computer user-interface techniques of cutting, pasting, and dragging.

7. The workstation of claim 1, further comprising a means for repeatedly playing a segment of the digital video information while allowing the operator to move the digital audio segment associated with that video segment forward or backward in time so as to synchronize events in the digital audio segment and the digital video information.

8. The workstation of claim 1, further comprising a means for repeatedly playing a segment of the digital video information while successively playing different versions of a segment of the digital audio information associated with the digital video information so as to enable the operator to choose one version of the digital audio segment.

9. The workstation of claim 1, further comprising a means for storing, in association with a particular point of the digital audio information, a digitized voice or textual message for later reference regarding the digital audio information.

10. The workstation of claim 1, further comprising a means for digitizing analog video information to produce the digital video information for storage.

11. The workstation of claim 10, wherein the accessed video information is from an identical time portion as the indicated audio information.

12. The workstation of claim 10, wherein the accessed video information is offset from the selected audio information by a particular time period indicated.

13. The workstation of claim 10, wherein the accessed video information is displayed essentially immediately upon the selection of the associated audio information.

14. The workstation of claim 10, further comprising means for displaying a visual timeline which represents waveforms of the audio information.

15. The workstation of claim 10, further comprising means for indicating segments of the digital audio information on a computer display and for allowing editing those segments by using computer user-interface techniques of cutting, pasting, and dragging.

16. The workstation of claim 10, further comprising a means for repeatedly playing a segment of the digital video information while allowing the operator to move the digital audio segment associated with that video segment forward or backward in time so as to synchronize events in the digital audio segment and the digital video information.

17. The workstation of claim 10, further comprising a means for repeatedly playing a segment of the digital video information while successively playing different versions of a segment of the digital audio information associated with the digital video information so as to enable the operator to choose one version of the digital audio segment.

18. The workstation of claim 10, further comprising a means for storing, in association with a particular point of the digital audio information, a digitized voice or textual message for later reference regarding the digital audio information.

19. A digital audio workstation comprising:

means for storing multiple tracks of digital audio information;

means for storing video information having frame rate and synchronized to said digital audio information in a storage medium that provides non-linear and random access to any selected portion of said video information;

means for selecting a portion of said multiple tracks of digital audio information at a resolution less than the frame rate of the video information; and means for displaying portions of said video information associated with said digital audio information during editing of said digital audio information.

20. A digital audio workstation as defined in claim 19 wherein said means for selecting a portion of said multiple tracks of digital audio information includes means for editing said digital audio information at times corresponding to audio sampling boundaries.

21. A digital audio workstation as defined in claim 20 wherein said means for selecting a portion of said multiple tracks of digital audio information includes means for generating a timeline display containing information representative of said multiple tracks of digital audio information in a selected clip;

means for displaying a list of available audio clips in a workreel; and means for selecting audio clips in said workreel and transferring said audio clips from said workreel to said timeline to provide an edited clip in said timeline.

22. A digital audio workstation as defined in claim 21 further including means for controlling recording and playback of said digital audio information.

23. A digital audio workstation as defined in claim 21 further including means for associating locators representative of specific events with specific subframe locations in said digital audio information and means for accessing said specific subframe locations by selecting one of said locators.

24. A digital audio workstation as defined in claim 19 wherein said means for displaying portions of said video information includes means for repeatedly displaying a selected portion of said video information in a loop and wherein said means for selecting a portion of said multiple tracks of digital audio information includes means for recording digital audio information each time the selected portion of said video information is played.

25. A digital audio workstation as defined in claim 24 wherein said means for repeatedly displaying a selected portion of said video information in a loop includes means for automatically repeating said selected portion of video information after a predetermined delay.

26. A digital audio workstation as defined in claim 24 wherein said means for repeatedly displaying a selected portion of said video information in a loop includes means for displaying said selected portion of video information after manual initiation by a user.

27. A method for editing digital audio comprising the steps of:

storing multiple tracks of digital audio information;

storing video information having a frame rate and synchronized to said digital audio information in a storage medium that provides non-linear and random access to any selected portion of said video information;

selecting a portion of said multiple tracks of digital audio information at a resolution less than the frame rate of the video information; and displaying portions of said video information associated with said digital audio information during editing of said digital audio information.

28. The method of claim 27 wherein said step of selecting a portion of said multiple tracks of digital audio information includes editing said digital audio information at times corresponding to audio sampling boundaries.

29. The method of claim 28 wherein the step of selecting a portion of said multiple tracks of digital audio information includes the steps of:

generating a timeline display containing information representative of said multiple tracks of digital audio information in a selected clip;

displaying a list of available audio clips in a workreel; and selecting audio clips in said workreel and transferring said audio clips from said workreel to said timeline to provide an edited clip in said timeline.

30. The method of claim 29 further including the step of controlling recording and playback of said digital audio information.

31. The method of claim 29 further including the step of associating locators representative of specific events with specific subframe locations in said digital audio information and accessing said specific subframe locations by selecting one of said locators.

32. The method of claim 27 wherein said step of displaying portions of said video information includes repeatedly displaying a selected portion of said video information in a loop and wherein said step of selecting a portion of said multiple tracks of digital audio information includes recording digital audio information each time the selected portion of said video information is played.

33. The method of claim 32 wherein said repeatedly displaying a selected portion of said video information in a loop includes automatically repeating said selected portion of video information after a predetermined delay.

34. The method of claim 32 wherein said step of repeatedly displaying a selected portion of said video information in a loop includes displaying said selected portion of video information after manual initiation by a user.

* * * * *

UNITED STATES PATENT AND TRADEMARK OFFICE
CERTIFICATE OF CORRECTION

PATENT NO. : 5,467,288
DATED      : November 14, 1995
INVENTOR(S) : Peter J. Fasciano, et al It is certified that error appears in the above-indentified patent and that said Letters Patent is hereby corrected as shown below:

On the title page, item [21] should read --Appln. No.: 45,650--

Signed and Sealed this

Fifth Day of March, 1996

*Attest:*

BRUCE LEHMAN

*Attesting Officer*   *Commissioner of Patents and Trademarks*